United States Patent
Wang

(10) Patent No.: US 6,903,170 B2
(45) Date of Patent: Jun. 7, 2005

(54) OLEFIN POLYMERIZATION PROCESS USING TRIISOBUTYLALUMINUM AS A SCAVENGER

(75) Inventor: Shaotian Wang, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 73 days.

(21) Appl. No.: 10/673,302

(22) Filed: Sep. 29, 2003

(65) Prior Publication Data

US 2005/0070675 A1 Mar. 31, 2005

(51) Int. Cl.⁷ .................................................. C08F 4/44
(52) U.S. Cl. ..................... 526/160; 526/170; 526/943; 526/128; 526/129; 526/131; 526/134; 526/153; 526/158; 526/348.2; 526/348.5; 526/348.6; 526/352
(58) Field of Search ................................ 526/160, 170, 526/943, 126, 127, 130, 134, 132, 153, 158

(56) References Cited

U.S. PATENT DOCUMENTS

| | | | |
|---|---|---|---|
| 5,554,775 A | 9/1996 | Krishnamurti et al. ......... 556/7 |
| 5,770,663 A * | 6/1998 | Peifer et al. ................. 526/127 |
| 5,902,866 A | 5/1999 | Nagy et al. .................. 526/133 |
| 6,211,311 B1 * | 4/2001 | Wang et al. ................. 526/131 |
| 6,291,386 B1 | 9/2001 | Wang ......................... 502/124 |
| 6,403,736 B1 | 6/2002 | Wang ......................... 526/160 |
| 6,444,765 B1 | 9/2002 | Meverden .................... 526/153 |
| 6,476,165 B1 | 11/2002 | Wang ......................... 526/129 |
| 6,765,074 B2 * | 7/2004 | Sartain ....................... 526/153 |
| 6,812,304 B2 * | 11/2004 | Meverden et al. .......... 526/160 |
| 2002/0161144 A1 | 10/2002 | Wang et al. ................. 526/160 |
| 2002/0177675 A1 | 11/2002 | Wang et al. ................. 526/134 |

* cited by examiner

*Primary Examiner*—David W. Wu
*Assistant Examiner*—Rip A. Lee
(74) *Attorney, Agent, or Firm*—Jonathan L. Schuchardt

(57) ABSTRACT

Ethylene and optional comonomers are polymerized using a supported metallocene catalyst, an alumoxane activator, and triisobutylaluminum (TIBAL). A silica support is first pretreated with a silane compound and then with an organoboron compound. The treated silica is then combined with a Group 4 metallocene complex and an alumoxane to generate a supported, activated catalyst. While it was previously thought that the particular support treatment technique used herein provided benefits only for polymerizations catalyzed by non-metallocene single-site complexes, it has now been found that similar benefits can be realized even with conventional metallocenes if TIBAL is selected as the scavenger.

10 Claims, No Drawings

OLEFIN POLYMERIZATION PROCESS USING TRIISOBUTYLALUMINUM AS A SCAVENGER

FIELD OF THE INVENTION

The invention relates to a productive process for polymerizing olefins. The process uses a supported metallocene catalyst and triisobutylaluminum as a scavenger.

BACKGROUND OF THE INVENTION

Ziegler-Natta catalysts are a mainstay for polyolefin manufacture, but single-site (metallocene and non-metallocene) catalysts represent the industry's future. These catalysts are often more reactive than Ziegler-Natta catalysts, and they often produce polymers with improved physical properties.

Traditional "metallocenes" often incorporate a Group 4 transition metal (e.g, zirconium or titanium) and cyclopentadienyl, indenyl, or fluorenyl ligands ("Cp-like ligands"). Non-metallocene single-site catalysts, which evolved more recently, have ligands that are often isolobal with cyclopentadienyl and usually incorporate heteroatoms such as boron or nitrogen. Examples are boraaryl (see U.S. Pat. No. 5,554,775) and azaborolinyl (see U.S. Pat. No. 5,902,866).

Earlier, we reported a variety of chemical treatment methods that are particularly valuable for use with organometallic complexes that incorporate heteroatomic ligands (see U.S. Pat. No. 6,211,311). The '311 patent teaches that "heterometallocene" complexes, particularly supported ones, tend to deactivate more easily than traditional metallocenes, so supports are preferably pretreated with a chemical agent before introducing the complex. The reference also teaches to use a silane such as hexamethyldisilazane (HMDS) to reduce the surface hydroxyl content of supports, and to use trialkylboranes such as triethylborane (TEB) to treat supports to improve activity. In one comparative example (8C), triethylaluminum (TEAL) is used as a scavenger in a polymerization performed in the presence of a silica-supported bis(indenyl)zirconium dichloride. The silica in that example is not pretreated with either a silane or a trialkylborane. Nothing in the reference suggests using triisobutylaluminum (TIBAL) as a scavenger with traditional metallocenes in combination with the particular support-treatment techniques.

U.S. Pat. No. 6,403,736 teaches improved activities from addition of TIBAL instead of TEAL to a reaction mixture that contains a boraaryl complex and an ionic borate activator. The silica support used is pretreated with HMDS followed by TEB. Not taught or suggested, however, is the use of a conventional metallocene complex and an alumoxane activator instead of a boraaryl complex and a borate activator.

U.S. Pat. No. 6,444,765 similarly requires a boraaryl complex. It teaches to premix a portion of the alkylaluminum compound with the boraaryl complex. The process gives polyolefins with broad and/or bimodal molecular weight distributions. The reference teaches to use HMDS-treated, TEB-treated silica and provides some evidence that TIBAL is a better scavenger than TEAL (see Example 4B versus 4C and 6A versus 6C) when the complex is a boraaryl complex. The reference provides only limited results with a conventional metallocene (see Table 3), so any advantage from selecting TIBAL instead of TEAL as the scavenger is unclear.

U.S. Pat. No. 6,476,165 teaches an olefin polymerization process using fatty amine additives and a supported boraaryl complex. The support is treated with HMDS and TEB prior to combining it with the boraaryl complex. In each of the examples, TIBAL is added to the reactor as a scavenger. Missing is any teaching or suggestion to use a conventional metallocene as the organometallic complex.

U.S. Pat. No. 6,291,386 teaches a process for preparing single-site organometallic complexes, which may be boraaryl or conventional metallocene complexes. By adding an alkylaluminum compound to an organometallic halide complex and an ionic borate, the complex is first alkylated, then immediately activated "in situ." The reference generally teaches to use—among other treating agents—silanes, alkylboranes, and alumoxanes to modify the optional support. In Example 22, a supported catalyst is prepared by treating silica with HMDS, followed by TEB. This treated silica is combined with a boraaryl complex and an ionic borate activator to produce a precatayst. The precatalyst is then alkylated (and activated) "in situ" in the polymerization reactor by adding TIBAL. Other examples use conventional metallocenes instead of the boraaryl complex. Note, especially, the use of an ionic borate activator.

U.S. Pat. Appl. Publs. 2002/0161144 and 2002/0177675 teach processes for making polyolefins using boraaryl complexes. In each case, a silica support is pretreated with HMDS followed by TEB prior to combination with the boraaryl complex. Neither reference suggests the use of conventional metallocenes.

In sum, it is now appreciated that stepwise treatment of silica supports with HMDS followed by TEB provides benefits for olefin polymerizations catalyzed by ionic borate-activated, boraaryl complexes. Less clear, however, is the potential benefit of using this silica treatment method when the complex is a conventional metallocene and the activator is an alumoxane. In addition, the impact of selecting a particular scavenger for such a process is not well understood. On the other hand, better ways of activating single-site complexes, including conventional metallocenes, continue to be of interest.

SUMMARY OF THE INVENTION

The invention is an olefin polymerization process. The process uses a supported metallocene catalyst and triisobutylaluminum (TIBAL) as a scavenger to polymerize ethylene and optional comonomers. A silica support is first pretreated with a silane compound and then with an organoboron compound. The treated silica is then combined with a Group 4 metallocene complex and an alumoxane to generate a supported, activated catalyst.

I surprisingly found that such an olefin polymerization, when performed in the presence of TIBAL, gives an unexpected boost in activity compared with processes using other common scavengers such as triethylaluminum (TEAL). While it was previously thought that the particular support treatment technique used herein provided benefits only for polymerizations catalyzed by boraaryl and other non-metallocene is single-site complexes, I found that similar benefits can be realized even with conventional metallocenes if TIBAL is selected as the scavenger.

DETAILED DESCRIPTION OF THE INVENTION

The invention is an olefin polymerization process. Ethylene is polymerized either alone or in combination with one or more α-olefin comonomers, preferably $C_3$–$C_{20}$ α-olefins such as propylene, 1-butene, 1-hexene, 1-octene, and the like. Copolymers of ethylene and 1-butene, 1-hexene, or 1-octene are especially preferred.

The catalyst is a supported metallocene. By "metallocene," we mean conventional metallocenes based on substituted and unsubstituted cyclopentadienyl (Cp) and "Cp-like" ligands such as indenyl or fluorenyl. Each is characterized by the presence of a pi-coordinated cyclopentadienyl group in the complex. Simple examples are bis (cyclopentadienyl)zirconium dichloride, bis(indenyl) zirconium dichloride, bis(pentamethylcyclopentadienyl) titanium dichloride, bis(n-butylcyclopentadienyl)titanium dimethyl, and the like. The complexes can be bridged, but introducing bridging groups is normally not necessary and adds to catalyst cost. Excluded from our definition of "metallocene" are non-metallocene, single-site catalysts that incorporate heteroatoms as part of the pi-coordinating moiety, such as boraaryl or azaborolinyl complexes.

The metallocene includes a Group 4 transition metal. Group 4 transition metals are zirconium, titanium, and hafnium. Zirconium and titanium are preferred because numerous Zr and Ti complexes are either commercially available or easily synthesized.

In a preferred process of the invention, the metallocene complex has the structure $L_nMX_m$, wherein L is a substituted or unsubstituted cyclopentadienyl, indenyl, or fluorenyl ligand; M is a Group 4 transition metal; X is halogen, alkoxy, aryloxy, hydrocarbyl, dialkylamido, or siloxy; n is 1 to 3; m is 1 to 3; and n+m=4. More preferably, M is zirconium or titanium, X is chloride, and each L is cyclopentadienyl, indenyl, or fluorenyl.

The metallocene complex is supported on silica. Preferably, the silica has a surface area in the range of about 10 to about 700 $m^2/g$, more preferably from about 50 to about 500 $m^2/g$, and most preferably from about 100 to about 400 $m^2/g$. Preferably, the pore volume of the silica is in the range of about 0.1 to about 4.0 mL/g, more preferably from about 0.5 to about 3.5 mL/g, and most preferably from about 0.8 to about 3.0 mL/g. Preferably, the average particle size of the silica is in the range of about 1 to about 500 $\mu$m, more preferably from about 2 to about 200 $\mu$m, and most preferably from about 3 to about 100 $\mu$m. The average pore diameter is typically in the range of about 10 to about 1000 Å, preferably about 20 to about 500 Å, and most preferably about 50 to about 350 Å. Suitable silicas are commercially available from a wide variety of sources, including, for example Davison Chemical (e.g., 948 or 955) or PQ Corporation (MS3030).

The catalyst is made in three steps. In a first step, the silica is treated with a silane compound in an amount effective to reduce the surface hydroxyl content of the silica. Preferred silane compounds are alkylsilyl halides (e.g., chlorotrimethylsilane, dichlorodimethylsilane, and t-butylchlorodimethylsilane), alkyl disilazanes (e.g., hexamethyldisilazane (HMDS)), alkyl or aryl alkoxysilanes (e.g., cyclohexylmethyldimethoxy-ilane, methyltrimethoxysilane, and phenyltriethoxysilane). Alkyldi-ilazanes, particularly HMDS, are especially preferred. The amount of silane compound used varies, but it is typically in the range of about 5 to about 25 wt. %, preferably from about 10 to about 15 wt. %, based on the amount of silica to be treated. The silane treatment is conveniently performed by carefully adding the silane compound, with or without a solvent, to the stirred silica under an inert atmosphere. Any solvent used (typically a hydrocarbon, if any) can be stripped out or left in the mixture. Normally, the silane-treated silica is then calcined at elevated temperature (100° C. to 600° C., preferably 100° C. to 200° C.) and may be aged if desired prior to use in the next step.

In Step 2, the silane-treated silica is treated with an organoboron compound. Suitable organoboron compounds include alkyl, aryl, and alkoxy-substituted boron compounds, preferably trialkylboranes, triarylboranes, and trialkoxyboranes such as trimethylborane, triethylborane, triisobutylborane, trimethoxyborane, triethoxyborane, and triphenoxyborane. Triethylborane (TEB) and triphenylborane are most preferred.

The amount of organoboron compound used depends on the residual hydroxyl content of the silane-treated silica, the particular metallocene complex used, the identity and molecular weight of the organoboron compound, and other factors. Generally, however, it is preferred to use from about 1 to about 50 wt. %, preferably from about 10 to about 30 wt. % of the organoboron compound based on the amount of silane-treated silica used. The organoboron compound can be added neat or as a solution in a hydrocarbon or other inert solvent. In one convenient approach, the organoboron compound is carefully added to a hydrocarbon (hexane, heptane, or the like) slurry of the silane-treated silica at room temperature. Preferably, the mixture is heated to the reflux temperature of the solvent (60° C. to 150° C.) to ensure a complete reaction. Any solvents remaining are removed, preferably under vacuum, and the resulting silane-treated, borane-treated silica is dried.

In Step 3, the treated silica is combined with the Group 4 metallocene complex and an alumoxane. Suitable alumoxanes are well known. They include include methylalumoxane (MAO or PMAO), ethylalumoxane, diisobutylalumoxane, and the like, and mixtures thereof. Methylalumoxanes are preferred. The amount of alumoxane is adjusted to provide an aluminum to Group 4 metal (Al/M) molar ratio within the range of about 20 to about 2000. A more preferred ratio is within the range of about 50 to about 500; most preferred is the ratio from about 150 to about 250. The alumoxane can be combined with the treated support before (see Example A) or after the complex is combined with the support. Alternatively, the alumoxane and complex can be premixed prior to combination with the support (see Example B).

A solution of the metallocene complex (with or without the alumoxane) is conveniently combined with the treated silica, and solvents are removed in vacuo to recover a silica-supported metallocene that is useful in the olefin polymerization process of the invention. The supported catalyst typically contains from about 0.001 to about 0.5 mmol, more preferably from about 0.01 to about 0.05 mmol, of transition metal per gram of catalyst.

Triisobutylaluminum (TIBAL) is used as a scavenger. The amount of TIBAL used is within the range of about 10 to about 1000 moles per mole of Group 4 transition metal. A more preferred range is from about 20 to about 500 moles per mole of Group 4 metal. I surprisingly found that TIBAL works exceptionally well when compared with other common scavengers, particularly triethylaluminum (TEAL). Compare the results in Table 1 below: TIBAL provides an unexpected 50% increase in activity compared with TEAL.

The process of the invention can be used in any olefin polymerization that uses a supported catalyst. Preferably, the process is a slurry or gas-phase polymerization.

The following examples merely illustrate the invention. Those skilled in the art will recognize many variations that are within the spirit of the invention and scope of the claims.

EXAMPLE A

Supported Bis(indenyl)zirconium Dichloride Complex

Neat hexamethyldisilazane (HMDS) is added to Davison 948 silica with stirring in an amount equal to 12.5 wt. % based on the amount of silica, and the sample is mixed for 2 h. The HMDS-treated silica is then dried at 150° C. for 6 h in a fluidized bed dryer under a stream of dry nitrogen. The treated support is then aged for 4 weeks.

Triethylborane (TEB, Aldrich, 95+%), in an amount equal to 24.5 wt. % based on the amount of silica, is slowly added to a heptane slurry of the HMDS-treated silica (3.5 mL heptane per gram of HMDS-treated silica). The slurry is refluxed by heating in an oil bath at 100° C. for 6 h. After cooling to room temperature, the liquid is removed under vacuum and the solid is dried.

Methylalumoxane (45.5 mL of PMAO/toluene solution containing 6.8 wt. % Al, 2.2 M, product of Akzo) is slowly added to a portion of the TEB-treated silica (8.45 g) with stirring, and mixing continues for an additional 0.5 h. Toluene is then removed under vacuum and the resulting supported MAO product (14.9 g, 6.7 mmol Al/g of support) is recovered and vacuum dried.

A toluene solution (2.0 mL) containing bis(indenyl) zirconium dichloride (15 mg, 0.038 mmol, from Aldrich) is added to a sample of the supported MAO prepared above (1.14 g), and the mixture is stirred for 0.5 h. The desired product, Catalyst A, is isolated after vacuum drying. The catalyst contains 0.033 mmol Zr/g catalyst. Mole ratio of Al/Zr=200.

EXAMPLE B

Supported Bis(cyclopentadienyl)zirconium Dichloride Complex

A TEB-treated silica support is prepared as described in Example A (first two paragraphs). Bis(cyclopentadienyl) zirconium dichloride (16.5 mg, 0.056 mmol, from Aldrich) is dissolved in a solution of methylalumoxane (2.69 mL of a 30 wt. % solution of MAO in toluene, product of Albemarle). The complex/activator mixture is added to a sample of the TEB-treated support (2.0 g), and this mixture is stirred for is 0.5 h. The desired product, Catalyst B, is isolated after vacuum drying. The catalyst contains 0.020 mmol Zr/g catalyst. Mole ratio of Al/Zr=200.

EXAMPLE 1 AND COMPARATIVE EXAMPLE 2

Ethylene/1-Hexene Copolymerization

A one-liter, stainless-steel autoclave reactor is charged with Armostat® 710 fatty amine (4 mg in 1.0 mL heptane) and 1-hexene (80 mL) A solution of trialkylaluminum (triisobutylaluminum (TIBAL) for Example 1 or triethylaluminum (TEAL) for Comparative Example 2) in heptane (0.45 mL of 1.0 M solution) is flushed into the reactor with isobutane (350 mL). No hydrogen is added. Ethylene is added to the reactor (total reactor pressure: 400 psig), and the contents are allowed to equilibrate at 80° C.

Catalyst A (95 mg of supported catalyst) is injected into the reactor with the help of isobutane (50 mL) and nitrogen pressure. The polymerization proceeds for 20 minutes. The reactor is vented, and the resulting polymer is collected and dried under vacuum. Catalyst activities and polymer properties are reported in Table 1.

As Table 1 shows, activity increases by about 50% when TIBAL is used as the scavenger instead of TEAL.

EXAMPLE 3 AND COMPARATIVE EXAMPLE 4

Ethylene/1-Butene Copolymerization

A one-liter, stainless-steel autoclave reactor is charged with Armostat® 710 fatty amine (1 mg in 0.25 mL heptane) and 1-butene (5.0 mL) A solution of trialkylaluminum (triisobutylaluminum (TIBAL) for Example 3 or triethylaluminum (TEAL) for Comparative Example 4) in heptane (0.45 mL of 1.0 M solution) is flushed into the reactor with isobutane (440 mL). No hydrogen is added. Ethylene is added to the reactor (total reactor pressure: 310 psig), and the contents are allowed to equilibrate at 75° C.

Catalyst B (120 mg of supported catalyst) is injected into the reactor with the help of isobutane (50 mL) and nitrogen pressure. The polymerization proceeds for 1 h. The reactor is vented, and the resulting polymer is collected and dried under vacuum. Catalyst activities and polymer properties are reported in Table 1.

As Table 1 shows, activity increases by about 50% when TIBAL is used as the scavenger instead of TEAL.

TABLE 1

Polymerization Results

| Ex. | Catalyst | α-Olefin | $R_3Al$ | Activity | $MI_2$ | Mw/Mn | Mw | Density (g/cm$^3$) |
|---|---|---|---|---|---|---|---|---|
| 1 | A | 1-hexene | TIBAL | 3247 | 0.53 | 3.0 | 139 K | 0.918 |
| C2 | A | 1-hexene | TEAL | 2163 | 0.74 | 3.3 | 120 K | 0.920 |
| 3 | B | 1-butene | TIBAL | 141 | 0.03 | 3.5 | 155 K | 0.942 |
| C4 | B | 1-butene | TEAL | 91 | 0.15 | 3.5 | 143 K | 0.942 |

Catalyst A = supported bis(indenyl)ZrCl$_2$ (95 mg); MAO combined with treated silica and used at 200:1 molar Al/Zr; total reactor pressure: 400 psig; 80 mL of 1-hexene; 0.45 mmol of TEAL or TIBAL used; 80° C.; 20 min. reaction time. Activities are in grams of polymer per gram catalyst per hour.
Catalyst B = supported bis(cyclopentadienyl)ZrCl$_2$ (120 mg); MAO combined with complex before supporting and used at 200:1 molar Al/Zr; total reactor pressure: 310 psig; 5 mL of 1-butene; 0.45 mmol of TEAL or TIBAL used; 75° C.; 1 h reaction time. Activities are in grams of polymer per gram catalyst per hour.

The preceding examples are meant only as illustrations. The following claims define the invention.

I claim:

1. A process which comprises polymerizing ethylene and, optionally, an alpha-olefin comonomer in the presence of a supported, activated metallocene catalyst and triisobutyla-
luminum to produce an ethylene polymer or copolymer;
wherein the supported, activated catalyst is made by:
(a) treating silica with a silane compound in an amount effective to reduce the surface hydroxyl content of the silica;
(b) treating the product from step (a) with an organoboron compound; and
(c) combining the product from step (b) with a Group 4 metallocene complex and an alumoxane such that the aluminum to Group 4 metal (Al/M) molar ratio is within the range of about 20 to about 2000; and
wherein the triisobutylaluminum is added to the reactor in an amount within the range of about 10 to about 1000 moles of triisobutylaluminum per mole of Group 4 metal.

2. The process of claim 1 wherein the comonomer is selected from the group consisting of propylene, 1-butene, 1-hexene, 1-octene, and mixtures thereof.

3. The process of claim 1 wherein the silica is calcined at a temperature within the range of about 100° C. to about 600° C. prior to step (b).

4. The process of claim 1 wherein the silane compound is hexamethyldisilazane.

5. The process of claim 1 wherein the organoboron compound is selected from the group consisting of triethylborane and triphenylborane.

6. The process of claim 1 wherein the metallocene complex has the structure $L_nMX_m$, wherein L is a substituted or unsubstituted cyclopentadienyl, indenyl, or fluorenyl ligand; M is a Group 4 transition metal; X is halogen, alkoxy, aryloxy, hydrocarbyl, dialkylamido, or siloxy; n is 1 to 3; m is 1 to 3; and n+m=4.

7. The process of claim 1 wherein the alumoxane is methylalumoxane.

8. The process of claim 1 wherein the aluminum to Group 4 metal molar ratio in step (c) is within the range of about 150 to about 250.

9. The process of claim 1 wherein the triisobutylaluminum is added to the reactor in an amount within the range of about 20 to about 500 moles of triisobutylaluminum per mole of Group 4 metal.

10. A process which comprises polymerizing ethylene and a comonomer selected from the group consisting of 1-butene, 1-hexene, 1-octene, and mixtures thereof, in the presence of a supported, activated metallocene catalyst and triisobutylaluminum to produce an ethylene copolymer;
wherein the supported, activated catalyst is made by:
(a) treating calcined silica with hexamethyldisilazane in an amount effective to reduce the surface hydroxyl content of the silica;
(b) treating the product from step (a) with an organoboron compound selected from the group consisting of triethylborane and triphenylborane; and
(c) combining the product from step (b) with:
i) a Group 4 metallocene complex having the structure $L_nMX_m$, wherein L is a substituted or unsubstituted cyclopentadienyl, indenyl, or fluorenyl ligand; M is a Group 4 transition metal; X is halogen, alkoxy, aryloxy, hydrocarbyl, dialkylamido, or siloxy; n is 1 to 3; m is 1 to 3; and n+m=4; and
ii) methylalumoxane;
such that the aluminum to Group 4 metal (Al/M) molar ratio is within the range of about 20 to about 2000; and
wherein the triisobutylaluminum is added to the reactor in an amount within the range of about 20 to about 500 moles of triisobutylaluminum per mole of Group 4 metal.

* * * * *